(No Model.)

2 Sheets—Sheet 1.

G. LISPENARD.
CARD EDGING MACHINE.

No. 434,088. Patented Aug. 12, 1890.

Witnesses:
D. H. Haywood
C. J. Sundgren

Inventor:
George Lispenard
by his Attorneys
Brown & Griswold (No Model.) 2 Sheets—Sheet 2.

G. LISPENARD.
CARD EDGING MACHINE.

No. 434,088. Patented Aug. 12, 1890.

Witnesses:—
D. H. Haywood
C. Sundgren

Inventor:
George Lispenard
by his Attorneys
Brown & Griswold

UNITED STATES PATENT OFFICE.

GEORGE LISPENARD, OF BROOKLYN, ASSIGNOR TO HENRY GUGGENHEIMER, OF NEW YORK, N. Y.

CARD-EDGING MACHINE.

SPECIFICATION forming part of Letters Patent No. 434,088, dated August 12, 1890.

Application filed November 7, 1889. Serial No. 329,551. (No model.)

*To all whom it may concern:*

Be it known that I, GEORGE LISPENARD, of Brooklyn, in the county of Kings and State of New York, have invented a certain new and useful Improvement in Card-Edging Machines, of which the following is a specification.

In carrying out my improvement I employ shearing mechanism, which mechanism comprises a rotary member provided upon its periphery with rows of alternate projections and depressions, and a stationary member provided, also, with alternating projections and depressions, the projections of the one member extending into the depressions of the other when the rotary member is rotated.

I will describe my improvement in detail, and then point out the novel features in claims.

Figure 1:
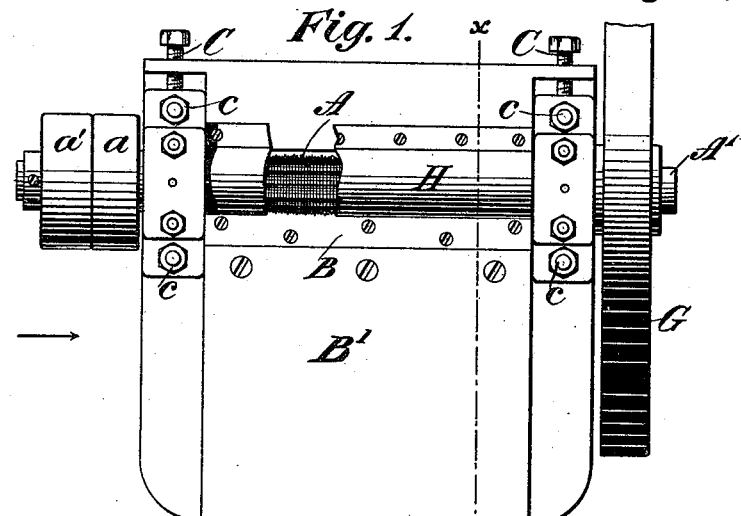
Figure 2:
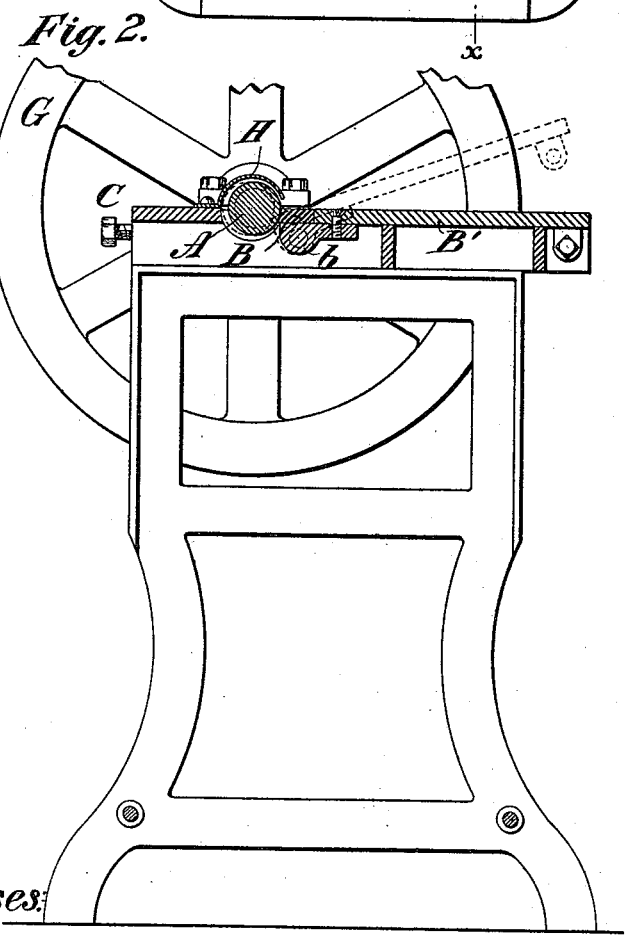
Figure 3:
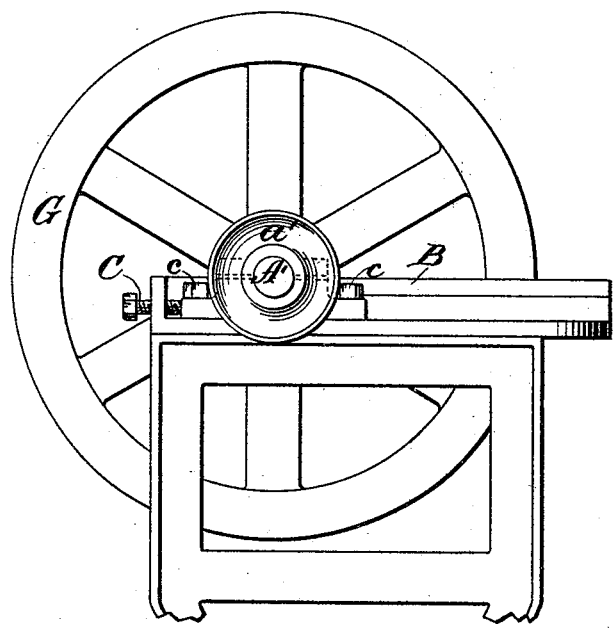
Figure 4:
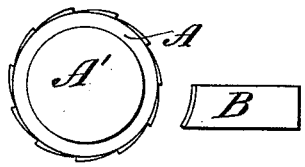
Figure 5:
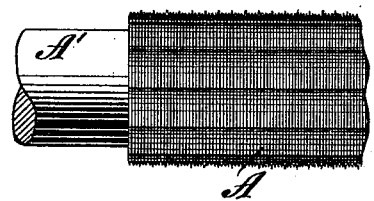
Figure 6:
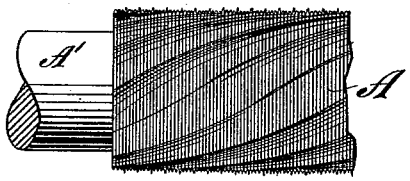

In the accompanying drawings, Figure 1 is a plan or top view of a machine embodying my improvement. Fig. 2 is a vertical section taken on the line $x$ $x$, Fig. 1. Fig. 3 is an end view of the machine, looking in the direction of the arrow, Fig. 1. Fig. 4 is a detail on an enlarged scale of the rotary and stationary portions of the shearing mechanism, the same being shown in end view. Fig. 5 is a side view, on an enlarged scale, of one form of the rotary member of the shearing-mechanism, portions being broken away to save space. Fig. 6 is a view similar to Fig. 5, but showing a modified construction of the rotary member.

Similar letters of reference designate corresponding parts in all the figures.

A designates a rotary member of the shearing mechanism. The same is mounted upon that which forms part of a shaft A', which shaft is journaled in suitable bearings in the frame of the machine. Rotary motion is imparted to the shaft A' and consequently to the rotary member A by means of a pulley $a$; also upon the shaft A' is mounted a loose pulley $a'$.

Referring more particularly to the example of my improvement illustrated in Fig. 5, the periphery of the rotary member A of the cutter is provided with rows of alternate projections and depressions, which rows extend parallel with the axis of said member. When said member is rotated, the projections thereon extend into corresponding depressions in a fixed member B, which member, as here shown, is mounted upon a table B'. Upon said fixed member are also projections which extend into the depressions upon the rotary member. When rotary motion is imparted to the rotary member and a card is passed along the table B' until its edge is brought in contact with the rotary member A, the rotation of said member will, by its co-operation with the fixed member, cause alternate projections and depressions, or, in other words, serrations to be sheared or cut in the edge of the card thus presented. By presenting the edges of the card successively to the shearing mechanism all the edges will be thus serrated.

In Fig. 6 I have shown that the rows of alternate projections and depressions instead of extending parallel with the axis of the rotary member A may extend spirally about the same. The effect, however, in this form of the device will be the same as that of the form shown in Fig. 5.

In the description thus far offered straight cuts only are effected upon the edge of the card; but such cuttings may be beveled, and for this purpose I raise the table B' to any desired angle, as shown more clearly in dotted outline in Fig. 2. The projections and depressions in the stationary member B will when thus raised be at an angle to the direction of rotation of the rotary member A, and the result will be a beveled cutting upon the edge of the card. The table B', it will be observed, is adapted to swing upon a plate $b$ for this purpose, and when raised may be maintained in any suitable manner. When the table B' is thus adjusted, the fixed member B will be of course brought nearer to or farther from the rotary member A, according to the degree of angle to which said fixed member will be raised, and it therefore becomes necessary to adjust either the fixed member or the rotary member relatively to the other in a horizontal direction.

I have shown means for adjusting the rotary member, consisting in set-screws C, having bearings in a portion of the frame and at their inner ends bearing against the journal-boxes of the rotary member A. Such journal-boxes are capable of horizontal movement, and when adjusted either rearwardly or forwardly may be fixed in the position into which they are adjusted by means of holding-down bolts c. This adjustment of the journal-boxes and consequently of the member A has another advantage in that the member A may be adjusted toward the fixed member B in order to compensate for wear which may occur upon the member B, it being my purpose to construct the rotary member A of a hard metal—such as steel—while the fixed member is composed of a softer metal.

Secured to the bed of the machine and extending over the rotary member A is a guard H, which operates to prevent an operator from passing his fingers inwardly too far and thus become injured while feeding the cards. Upon the shaft A' is a fly-wheel G.

What I claim as my invention, and desire to secure by Letters Patent, is—

1. In a card-edging machine, the combination, with a rotary cylindrical member provided upon its periphery with alternate projections and depressions extending circumferentially about the member, of a stationary member provided at its face toward the rotary member with alternate projections and depressions, the projections on the one member extending into the depressions on the other member, the ends of the projections on the stationary member forming a support for the edge of a card, and means for rotating said rotary member, substantially as set forth.

2. In a card-edging machine, the combination, with a cylindrical member provided upon its periphery with alternate projections and depressions extending circumferentially about said member, of a stationary member provided at its face toward the rotary member with alternate projections and depressions, the members being so arranged with respect to each other that the projections on the one will extend into the depressions on the other, the ends of the projections on the stationary member forming a support for the edge of a card, an adjustable rocking table for guiding the card to its support to be engaged by the rotary member, and means for rotating the said rotary member, substantially as set forth.

GEORGE LISPENARD.

Witnesses:
FREDK. HAYNES,
GEORGE BARRY.